(12) United States Patent
Hidaka et al.

(10) Patent No.: US 7,696,378 B2
(45) Date of Patent: Apr. 13, 2010

(54) DEPOLYMERIZATION PROCESS

(75) Inventors: Masaru Hidaka, Yamatotakada (JP); Takaharu Nakagawa, Hirakata (JP); Toyoyuki Urabe, Ikeda (JP); Tetsuya Maekawa, Nishinomiya (JP); Hiroyuki Yoshida, Sakai (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 293 days.

(21) Appl. No.: 10/533,432

(22) PCT Filed: Nov. 6, 2003

(86) PCT No.: PCT/JP03/14136

§ 371 (c)(1),
(2), (4) Date: Apr. 21, 2006

(87) PCT Pub. No.: WO2004/041917

PCT Pub. Date: May 21, 2004

(65) Prior Publication Data

US 2006/0247465 A1    Nov. 2, 2006

(30) Foreign Application Priority Data

Nov. 7, 2002  (JP) .............................. 2002-324398
Jul. 29, 2003  (JP) .............................. 2003-281994

(51) Int. Cl.
*C07C 51/00* (2006.01)
*C08F 6/00* (2006.01)

(52) U.S. Cl. ...................................... 562/513; 528/499
(58) Field of Classification Search ............. 526/124.2, 526/317.1
See application file for complete search history.

(56) References Cited

FOREIGN PATENT DOCUMENTS

| JP | 05-031000 | | 2/1993 |
|---|---|---|---|
| JP | 10-087872 | | 4/1998 |
| JP | 10-324769 | | 12/1998 |
| JP | 11-080745 | | 3/1999 |
| JP | 2000053801 | * | 2/2000 |
| JP | 2002-167453 | | 6/2002 |
| JP | 2002-226871 | * | 8/2002 |
| JP | 2003-41048 | | 2/2003 |
| WO | 95/04796 | | 2/1995 |
| WO | WO 9504796 A1 | * | 2/1995 |

OTHER PUBLICATIONS

U.S. Appl. No. 10/593,081, filed Sep. 15, 2006, Hidaka et al.

* cited by examiner

*Primary Examiner*—Paul A Zucker
(74) *Attorney, Agent, or Firm*—Oblon, Spivak, McClelland, Maier & Neustadt, L.L.P.

(57) ABSTRACT

The present invention relates to a process for decomposing a polymer into a monomer or oligomer by hydrolysis with sub- or supercritical water. The process of the present invention is characterized in that at least a part of the polymer is a polymer comprising a constitutional unit derived from an organic acid in the molecular structure, and the polymer being contacted with sub- or supercritical water in the presence of a water-insoluble base.

1 Claim, 2 Drawing Sheets

DEPOLYMERIZATION PROCESS

TECHNICAL FIELD

The present invention relates to a process for decomposing a polymer with sub- or supercritical water, especially a process for decomposing plastic wastes.

BACKGROUND ART

Most of plastic wastes have conventionally been treated by landfill or incineration, and not been effectively used as resources. In landfill, there are such problems as difficulties in finding sites for landfill and destabilization at the ground of landfill. In incineration, there are such problems as a deterioration of the furnace, a generation of hazardous gases and offensive odors, and an emission of $CO_2$.

In Japan, the Law for Promotion of Sorted Collection and Recycling of Containers and Packaging was enacted in 1995, and therefore the recovery and recycling of plastic wastes has been legally obligated. Additionally, other various laws concerning the recycling were enacted. Thus, the necessity of the recovery and recycling of plastic products increases.

In recent years, the decomposition of plastic wastes for recycling has been attempted to deal with these problems. JP-A-5-31000 discloses a process which comprises decomposing a plastic waste by a reaction using super- or subcritical water as a reaction media and recovering the decomposition product. JP-A-10-87872 discloses a process which comprises decomposing a plastic component of a fiber-reinforced plastic used in various structural materials with super- or subcritical water, and recovering the fiber such as a glass fiber or a carbon fiber for recycling.

In this point, it is difficult for a conventional process for decomposing a plastic using only sub- or supercritical water, to recover a monomer or oligomer reusable as a plastic raw material in high yield (see Comparative Example 1 described later). This appears to be caused by the fact that a monomer or oligomer obtained by the decomposition of a plastic (polymer) may be further decomposed by sub- or supercritical water, or the amount of a monomer or oligomer may be decreased by a side reaction. Therefore, the conventional plastic decomposition product obtained by sub- or supercritical water may be mainly recycled as a liquid fuel.

There is a need for a process for decomposing the plastic waste in which a monomer or oligomer can be recovered as a plastic raw material, and not as a liquid fuel in high yield in order to make effective use of petroleum resources.

DISCLOSURE OF INVENTION

The object of the present invention is therefore to provide a process for decomposing a polymer, wherein a monomer or oligomer reusable as a raw material can be recovered in high yield.

This object is achieved by a process for decomposing a polymer into a monomer or oligomer by hydrolysis with sub- or supercritical water, characterized in that at least a part of the polymer is a polymer comprising a constitutional unit derived from an organic acid in the molecular structure, and the polymer being contacted with sub- or supercritical water in the presence of a water-insoluble base. According to the process of the present invention, a monomer or oligomer reusable as a polymer (plastic) raw material can be recovered in high yield.

BEST MODE FOR CARRYING OUT THE INVENTION

Figure 1:
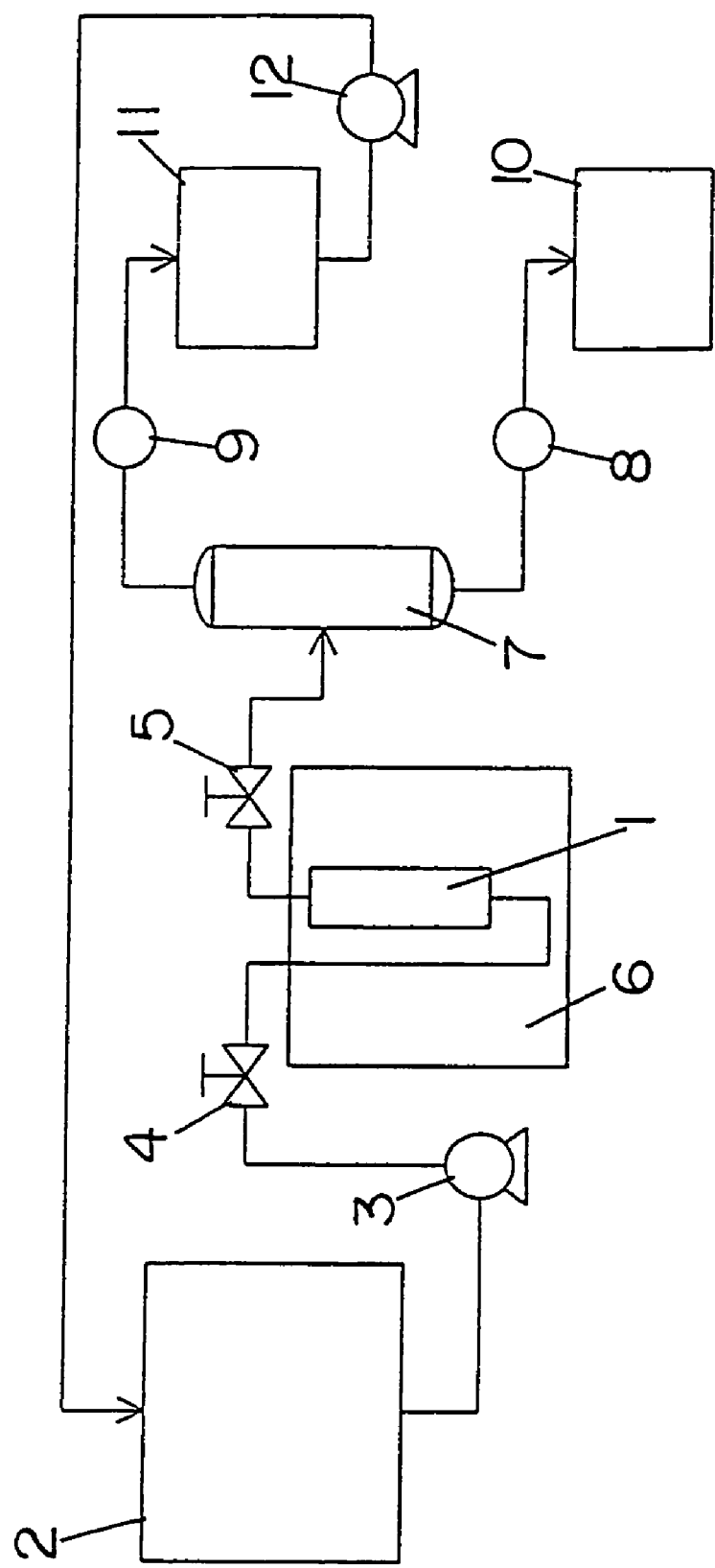
FIG. 1 shows one example of a plant system for decomposing a polymer according to a process of the present invention.

The present invention relates to a process for decomposing a polymer into a monomer or oligomer by hydrolysis with sub- or supercritical water, and which is characterized in that at least a part of the polymer is a polymer comprising a constitutional unit derived from an organic acid in the molecular structure, and the polymer being contacted with sub- or supercritical water in the presence of a water-insoluble base.

The supercritical water refers here to a water in a state that is above the critical point (critical temperature: 374.4° C., critical pressure: 22.1 MPa). The subcritical water in the present invention refers to a water in a state that is not more than the critical point and near the critical point (preferably from 170 to 374° C.).

According to the present invention, a polymer comprising a constitutional unit derived from an organic acid in the molecular structure, for example, a polyester or a polyamide, is contacted with sub- or supercritical water in the presence of a water-insoluble base, and thereby a monomer or oligomer such as an organic acid, an alcohol or an amine, which is reusable in polymer (plastic) synthesis, can be recovered in high yield (see Examples described later).

The action mechanism of the present invention is not completely obvious, but it is considered as follows:

The decomposition of a polymer with sub- or supercritical water is mainly performed by hydrolysis and pyrolysis. Therefore, when a polymer comprising a constitutional unit derived from an organic acid in the molecular structure (for example, a polyester or a polyamide) is hydrolyzed with sub- or supercritical water to recover a desired monomer or oligomer (for example, a carboxylic acid and an alcohol or an amine), it is impossible to decompose all of the polymer into the desired monomer or oligomer due to the pyrolysis of the polymer.

Furthermore, an organic acid such as a carboxylic acid obtained by hydrolysis is also decomposed or transformed into the other substance by further pyrolysis with sub- or supercritical water and the like.

The reaction partner of the organic acid in the polymer, for example, an alcohol or an amine decreases through a side reaction with the organic acid obtained by the decomposition, as well as further decomposition or conversion by sub- or supercritical water. For example, a carbocation is generated from an alcohol in the presence of acid ($H^+$), and the alkenylation, the dimerization or the like is caused via this carbocation formation.

For these reasons, it was not possible to recover a desired monomer or oligomer (for example, a carboxylic acid and an alcohol) in high yield in a conventional process for decomposing a polymer (for example, a polyester) only with sub- or supercritical water.

In contrast, it is considered that hydrolysis dominates over pyrolysis by performing the decomposition of the polymer according to the present invention with a sub- or supercritical water in the presence of a water-insoluble base. As a result, the decomposition into a desired monomer or oligomer becomes dominant.

It is also considered that an organic acid obtained by the decomposition is neutralized by a water-insoluble base and thus the side reaction of the organic acid with an alcohol and the like is inhibited.

The present inventors believe that an organic acid itself may form a water-insoluble salt with a water-insoluble base to deposit in sub- or supercritical water. Thus, the organic acid salt may deposit in sub- or supercritical water and therefore the decomposition of the organic acid may be inhibited.

In addition, higher polymer decomposition rate may be attained in a short time by using a water-insoluble base in the decomposition of the polymer with sub- or supercritical water (see Examples described later). This may lead to shortening of the process time.

The polymer to be decomposed in the present invention includes a polymer which produces an organic acid by hydrolysis, for example, a polyester or a polyamide, preferably a polyester. In the process of the present invention for decomposing a polymer with sub- or supercritical water, hydrolysis may become dominant, but pyrolysis also occurs. Therefore, a polymer which can not be hydrolyzed under usual conditions, i.e. a crosslinked polymer, can be also decomposed and a monomer or oligomer can be recovered according to the present invention. The polymer to be decomposed in the present invention may include an uncrosslinked polymer (e.g. a polyethylene terephthalate) and/or a crosslinked polymer (e.g. a crosslinked polyester, for example, obtained by crosslinking an unsaturated polyester with a crosslinking agent such as styrene).

The object of the present invention is to recover a reusable monomer such as an organic acid and an alcohol in high yield by making hydrolysis with sub- or supercritical water superior, suppressing the side reaction due to an organic acid, inhibiting the decomposition of an organic acid itself and the like. Therefore, the polymer to be decomposed in the present invention may include a polymer having no constitutional unit derived from an organic acid, for example, a copolymer comprising a hydrolyzable constitutional unit and a nonhydrolyzable constitutional unit and/or a nonhydrolyzable polymer and the like, within the range where this purpose is not impaired. The polymer to be decomposed in the present invention preferably includes a hydrolyzable polymer (e.g. a polyether) as an organic acid-free polymer, because these polymers can produce a monomer reusable in polymer synthesis by hydrolysis.

The polymer to be decomposed by the present invention is preferably a polyester, more preferably a polyester having no chlorine in the molecular structure. When the polymer to be decomposed by the present invention comprises a chlorine-containing polymer, hydrochloric acid and the like are formed in sub- or supercritical water after the formation of chlorine. This hydrochloric acid and the like are not desired, because the recovery rate of a monomer decreases due to a side reaction with them.

The base used in the present invention is a water-insoluble base, for example, $CaCO_3$. It is not possible to recover an organic acid in high yield, when a readily water-soluble base such as KOH or NaOH is used (see Comparative Examples 2 and 3 described later). Accordingly, the water-insoluble base in the present invention refers to a base other than a readily water-soluble base (e.g. KOH or NaOH), in particular a base having a solubility of not more than 0.5 g/100 g of water at 25° C. The value of the solubility of a base represents here the amount (g) of the base soluble in 100 g of water at 25° C.

The water-insoluble base in the present invention has a solubility in the range preferably of $1.0 \times 10^{-4}$ to 0.5 g/100 g of water, and more preferably of $8.0 \times 10^{-4}$ to 0.5 g/100 g of water, at 25° C. By using water-insoluble base having a solubility in such a range, the effect of the present invention can be preferably attained and the decomposition monomer or oligomer can be recovered in higher yield.

The water-insoluble base in the present invention is preferably selected from a compound of a metal of group II, and more preferably selected from a Ca or Ba compound, but is not limited to these. Examples of the water-insoluble base include calcium carbonate ($CaCO_3$: $1.4 \times 10^{-3}$ g/100 g of water), barium carbonate ($BaCO_3$: $2.2 \times 10^{-3}$ g/100 g of water), calcium hydroxide ($Ca(OH)_2$: $1.85 \times 10^{-1}$ g/100 g of water), magnesium carbonate ($MgCO_3$: $1.06 \times 10^{-2}$ g/100 g of water), magnesium hydroxide ($Mg(OH)_2$: $9 \times 10^{-4}$ g/100 g of water) and the like, preferably $CaCO_3$, $BaCO_3$ or $Ca(OH)_2$, and more preferably $CaCO_3$. Each of these water-insoluble bases may be used alone or in combination. In addition, when the water-insoluble base is contained in advance in the polymer to be decomposed, the effect of the present invention may also be achieved by this contained water-insoluble base.

The water-insoluble base as described above is generally weakly-basic, and therefore, may be more safely handled and the problems, such as the corrosion of an apparatus and the like, do not likely occur compared to the case where a strong base such as KOH or NaOH is used.

In addition, the water-insoluble base is generally weakly-basic and an organic acid (e.g. a carboxylic acid), which is a decomposition product, is also generally weakly-basic. Therefore, a mixture of the water-insoluble base and an organic acid and a salt thereof may have a buffering action. This buffering action can prevent a drastic pH change in sub- or supercritical water. This may also contribute high recovery rates of a monomer or oligomer in the polymer decomposition with sub- or supercritical water according to the present invention.

In the present invention, the amounts of water and water-insoluble base used can be varied depending on the kind and amount of a polymer to be decomposed, and the like. However, 100 to 500 parts by weight of water and/or 50 to 200 parts by weight of water-insoluble base are preferably used relative to 100 parts by weight of the polymer.

The decomposition time of the polymer in the present invention can be varied depending on the conditions, such as the decomposition temperature and the like. The decomposition time of the polymer in the present invention is generally from 10 to 40 minutes. In terms of costs, it is desirable for the decomposition time to be short.

The decomposition temperature of the polymer is preferably from 170 to 450° C., more preferably from 200 to 374° C. The decomposition of the polymer can be more rapidly performed by setting the decomposition temperature to not less than 170° C. Additionally, the recovery rate of a monomer or oligomer can be increased by setting the decomposition temperature to not more than 450° C., since the influence of the pyrolysis can be suppressed. The pressure of polymer decomposition in the present invention can be varied depending on the decomposition temperature, but is preferably from 4 to 50 MPa.

After the polymer is decomposed with sub- or supercritical water according to the present invention, a reusable monomer or oligomer such as an organic acid and an alcohol, for example, can be recovered as follows:

After the decomposition of the polyester, to a mixture of the decomposition product thereof and water is added more or less the same amount of a non-water-soluble organic solvent to remove a by-product from the mixture. After stirring, the mixture is allowed to stand and separated into an organic phase and an aqueous phase. The aqueous phase contains an organic acid salt and an alcohol. To the aqueous phase is added an acid to produce an organic acid from the organic acid salt. Water is evaporated away from the aqueous phase. The aqueous phase is concentrated to almost dryness and then an organic solvent is added. The organic acid and the alcohol are dissolved in the organic solvent. The insoluble material (for example, a salt of the aforementioned acid added to liberate the organic acid) is removed by the filtration of the organic solution. The alcohol is obtained by the fractional distillation of the organic solution. The organic acid is obtained as a residue of the organic solution.

FIG. 1 shows one example of a plant system for decomposing a polymer according to a process of the present invention. A polymer and a water-insoluble base are added into a decomposition reactor 1. Water is added into the decomposition reactor 1 from a water tank 2 by using a high-pressure pump 3. In this case, it is desirable that the amount of water to be added into the decomposition reactor 1 is not more than 50 vol. % of the capacity of the decomposition reactor 1. The decomposition reactor 1 is sealed by closing a valve 4 and a decompression valve 5. Then, the decomposition reactor 1 is externally heated with a constant-temperature bath 6 such that the temperature in the decomposition reactor 1 increases to a given temperature in the range of 250 to 450° C. Water in the decomposition reactor 1 is kept in a sub- or supercritical state for a given time to decompose a polymer. After that, the pressure in the decomposition reactor 1 is decreased by controlling the decompression valve 5, and the temperature in the decomposition reactor 1 is decreased to a given temperature in the range of 100 to 200° C. by adiabatic expansion or external cooling. Then, a decomposition product of the polymer is fed into a distiller 7 together with water from the decomposition reactor 1. The decomposition product containing a monomer or oligomer, for example, an organic acid and an alcohol in salt forms, are recovered in a recovery tank 10 from the bottom of the distiller 7 through a condenser 8. The organic acid salt is mainly recovered as a solid. Water is recovered in a water recovery tank 11 from the top of the distiller 7 through a condenser 9, and fed into the water tank 2 with a pump 12 for recycling.

To further illustrate the present invention, the following Examples are given.

Figure 2:
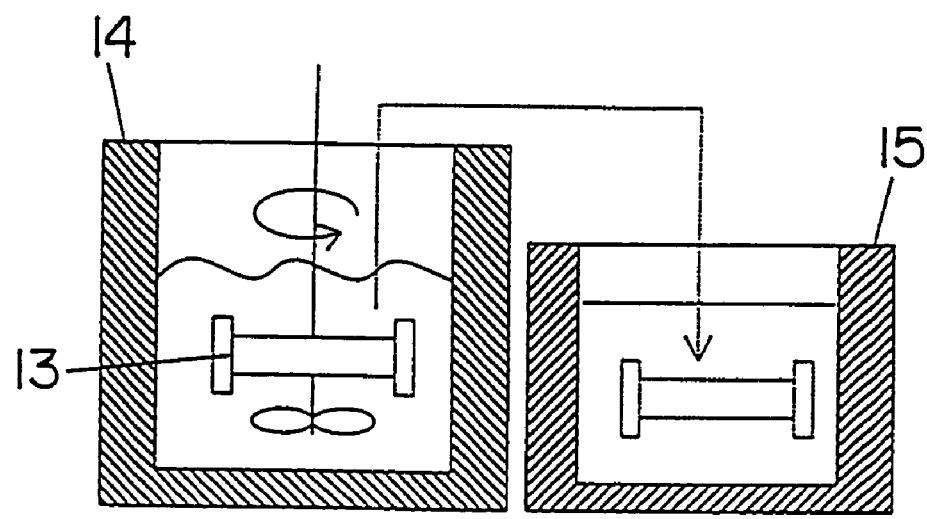
FIG. 2 shows a test apparatus used in Examples and Comparative Examples.

The Examples and Comparative Examples were performed using a test apparatus shown as in FIG. 2.

EXAMPLE 1

A cured resin of an unsaturated polyester resin (2 g; "RIGOLAC M-580" manufactured by SHOWA HIGHPOLYMER CO., LTD.), pure water (10 g) and calcium carbonate (2 g) were charged into a reaction tube 13. The air inside the reaction tube 13 was replaced with argon gas and the tube was sealed. This reaction tube 13 was immersed in a constant-temperature bath 14 at 360° C. to render the water in the reaction tube 13 in a subcritical state. While immersing the reaction tube 13 in the constant-temperature bath 14, a decomposition reaction was performed for 20 minutes. Then, the reaction tube 13 was taken out of the constant-temperature bath 14 and rapidly cooled up to a room temperature by immersing it in a cooling bath 15. Water, an organic acid salt, a dihydric alcohol, a by-product and calcium carbonate were in the content of the reaction tube 13. The undecomposed resin did not exist in the content at all. The decomposition rate was almost 100%.

A sufficient amount of water was added to this content to dissolve the organic acid salt. Then, calcium carbonate and the like were removed by filtration. To the obtained filtrate was added chloroform to remove the by-product, and the mixture was divided into an organic phase and an aqueous phase. A dihydric alcohol and an organic acid salt are dissolved in an aqueous phase. The content of the dihydric alcohol in the aqueous phase was determined by gas chromatography. The value was assumed to be the recovery amount of dihydric alcohol, and the recovery rate of dihydric alcohol (%)=the recovery amount of dihydric alcohol/the estimated amount of dihydric alcohol in the resin×100 was calculated. The content of the organic acid salt (the content of the organic acid) in the aqueous phase was determined by ion chromatography. The value was assumed to be the recovery amount of organic acid, and the recovery rate of organic acid (%)=the recovery amount of organic acid/the estimated amount of organic acid in the resin×100 was calculated. These results are shown in Table 1.

EXAMPLE 2

The same procedure as in Example 1 was repeated except for using barium carbonate (2 g) as a water-insoluble base instead of calcium carbonate. The undecomposed resin did not exist in the content of the reaction tube 13 at all, and the decomposition rate was almost 100%. The results of Example 2 are shown in Table 1.

EXAMPLE 3

The same procedure as in Example 1 was repeated except for using calcium hydroxide (2 g) as a water-insoluble base instead of calcium carbonate. The undecomposed resin did not exist in the content of the reaction tube 13 at all, and the decomposition rate was almost 100%. The results of Example 3 are shown in Table 1.

EXAMPLE 4

The same procedure as in Example 1 was repeated except that the decomposition reaction was performed by immersing the reaction tube 13 in the constant-temperature bath 14 at 360° C. for 5 minutes, and the content of propylene glycol was only determined as the content of dihydric alcohol in the aqueous phase by gas chromatography. The undecomposed resin existed in the content of the reaction tube 13. From the content of this undecomposed resin, the decomposition rate (%)=(total amount of resin−the amount of undecomposed resin)/total amount of resin×100 was calculated. The results of Example 4 are shown in Table 1.

EXAMPLE 5

The same procedure as in Example 1 was repeated except that the decomposition reaction was performed by immersing the reaction tube 13 in the constant-temperature bath 14 at 360° C. for 2 minutes, and the content of propylene glycol was only determined as the content of dihydric alcohol in the aqueous phase by gas chromatography. The undecomposed resin existed in the content of the reaction tube 13, and the decomposition rate was calculated. The results of Example 5 are shown in Table 1.

COMPARATIVE EXAMPLE 1

The same procedure as in Example 1 was repeated except not using a water-insoluble base. The undecomposed resin did not exist in the content of the reaction tube 13 at all, and the decomposition rate was almost 100%. The results of Comparative Example 1 are shown in Table 2.

COMPARATIVE EXAMPLE 2

The same procedure as in Example 1 was repeated except for using potassium hydroxide (2 g) as a water-insoluble base instead of calcium carbonate. The undecomposed resin did not exist in the content of the reaction tube 13 at all, and the decomposition rate was almost 100%. The results of Comparative Example 2 are shown in Table 2.

COMPARATIVE EXAMPLE 3

The same procedure as in Example 1 was repeated except for using sodium hydroxide (2 g) as a water-insoluble base instead of calcium carbonate. The undecomposed resin did not exist in the content of the reaction tube 13 at all, and the decomposition rate was almost 100%. The results of Comparative Example 3 are shown in Table 2.

COMPARATIVE EXAMPLE 4

The same procedure as in Comparative Example 1 was repeated except that the decomposition reaction was performed by immersing the reaction tube 13 in the constant-temperature bath 14 at 360° C. for 5 minutes, and the content of propylene glycol was only determined as the content of dihydric alcohol in the aqueous phase by gas chromatography. The undecomposed resin existed in the content of the reaction tube 13, and the decomposition rate was calculated. The results of Comparative Example 4 are shown in Table 2.

COMPARATIVE EXAMPLE 5

The same procedure as in Comparative Example 1 was repeated except that the decomposition reaction was performed by immersing the reaction tube 13 in the constant-temperature bath 14 at 360° C. for 2 minutes, and the content of propylene glycol was only determined as the content of dihydric alcohol in the aqueous phase by gas chromatography. The undecomposed resin existed in the content of the reaction tube 13, and the decomposition rate was calculated. The results of Comparative Example 5 are shown in Table 2.

TABLE 1

|  | Ex. 1 | Ex. 2 | Ex. 3 | Ex. 4 | Ex. 5 |
| --- | --- | --- | --- | --- | --- |
| Decomposition temperature | 360° C. | 360° C. | 360° C. | 360° C. | 360° C. |
| Decomposition pressure | 18.7 MPa | 18.7 MPa | 18.7 MPa | 18.7 MPa | 18.7 MPa |
| Decomposition time | 20 min. | 20 min. | 20 min. | 5 min. | 2 min. |
| Base | CaCO$_3$ | BaCO$_3$ | Ca(OH)$_2$ | CaCO$_3$ | CaCO$_3$ |
| pH before Decomposition | 8.2 | 7.8 | 12.5 | 8.2 | 8.3 |
| pH after Decomposition | 7.3 | 5.9 | 11.1 | 6.8 | 6.9 |
| Decomposition rate | 100% | 100% | 100% | 58.0% | 28.6% |
| Recovery rate of dihydric alcohol | 46.6% | 44.3% | 48.7% | 22.2%* | 5.8%* |
| Recovery rate of organic acid | 21.2% | 4.7% | 13.2% | 36.8% | 22.9% |

*the value calculated only from the recovery amount of propylene glycol

TABLE 2

|  | Comp. Ex. 1 | Comp. Ex. 2 | Comp. Ex. 3 | Comp. Ex. 4 | Comp. Ex. 5 |
| --- | --- | --- | --- | --- | --- |
| Decomposition temperature | 360° C. | 360° C. | 360° C. | 360° C. | 360° C. |
| Decomposition pressure | 18.7 MPa | 18.7 MPa | 18.7 MPa | 18.7 MPa | 18.7 MPa |
| Decomposition time | 20 min. | 20 min. | 20 min. | 5 min. | 2 min. |
| Base | — | KOH | NaOH | — | — |
| pH before Decomposition | 6.8 | 13.5 | 13.5 | 6.8 | 6.9 |
| pH after Decomposition | 2.2 | 8.9 | 8.6 | 2.4 | 2.8 |
| Decomposition rate | 100% | 100% | 100% | 51.0% | 9.0% |
| Recovery rate of dihydric alcohol | 1.9% | 42.2% | 6.1% | 4.4%* | 3.3%* |
| Recovery rate of organic acid | 0% | 0% | 0% | 7.8% | 19.1% |

*the value calculated only from the recovery amount of propylene glycol

From Tables 1 and 2, in the decomposition of the polyester with subcritical water, it is confirmed that the recovery rates of dihydric alcohol and organic acid in Examples 1 to 3, where a water-insoluble base was used, increased more than that in Comparative Example 1, where the base was not used, and Comparative Examples 2 and 3, where a readily water-soluble base was used. In addition, it is confirmed by comparing Examples 4 and 5 with Comparative Examples 4 and 5 that the decomposition of the polyester was accelerated by using a water-insoluble base, and thereby the decomposition rate increased.

The invention claimed is:

1. A process for decomposing a crosslinked polyester having no chlorine into a monomer or oligomer, comprising:
   hydrolyzing a crosslinked polyester having no chlorine with sub- or supercritical water, and the crosslinked polyester being contacted with sub- or supercritical water in the presence of a water-insoluble base;
   recovering a monomer or oligomer obtained by decomposition of the crosslinked polyester,
   wherein the water-insoluble base comprises at least one compound selected from the group consisting of CaCO$_3$, BaCO$_3$ and Ca(OH)$_2$, and an amount of the water-insoluble base is 50 to 200 parts by weight relative to 100 parts by weight of the crosslinked polyester.

* * * * *